United States Patent
Becker et al.

(10) Patent No.: US 10,605,898 B2
(45) Date of Patent: Mar. 31, 2020

(54) 3D MEASUREMENT DEVICE WITH ACCESSORY INTERFACE

(71) Applicant: FARO Technologies, Inc., Lake Mary, FL (US)

(72) Inventors: Reinhard Becker, Ludwigsburg (DE); Andreas Ditte, Ludwigsburg (DE); Matthias Gramenz, Murr (DE); Andreas Woloschyn, Stuttgart (DE); Selim Hauschild, Kornwestheim (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 534 days.

(21) Appl. No.: 15/388,563

(22) Filed: Dec. 22, 2016

(65) Prior Publication Data

US 2017/0184703 A1 Jun. 29, 2017

(30) Foreign Application Priority Data

Dec. 27, 2015 (DE) .......................... 10 2015 122 843

(51) Int. Cl.
*G01S 7/481* (2006.01)
*G01S 17/89* (2020.01)
(Continued)

(52) U.S. Cl.
CPC .......... *G01S 7/4813* (2013.01); *G01S 7/4817* (2013.01); *G01S 17/023* (2013.01); *G01S 17/42* (2013.01); *G01S 17/89* (2013.01)

(58) Field of Classification Search
CPC ...... G01S 17/023; G01S 17/42; G01S 7/4813; G01S 7/4817; G01S 17/89
(Continued)

(56) References Cited

U.S. PATENT DOCUMENTS 8,830,485 B2 * 9/2014 Woloschyn ............. G01S 17/42
356/614
9,795,512 B2 * 10/2017 Cherkas .................... G01T 1/24
(Continued)

FOREIGN PATENT DOCUMENTS

DE 102009015922 A1 10/2010
DE 102009055988 B3 3/2011
(Continued)

OTHER PUBLICATIONS

Great Britain Search Report for Application No. GB1622187.1 dated Jun. 22, 2017; 3 pages.

*Primary Examiner* — Daniel L Murphy
(74) *Attorney, Agent, or Firm* — Cantor Colburn LLP

(57) ABSTRACT

A 3D measuring device is provided. The device includes a measuring head with a light transmitter and a light receiver. A control and evaluation device is coupled to the light transmitter and light receiver and determines the distance to the object. An accessory interface allows an accessory device to be mechanically connected to the measuring head and can be electrically connected to the control and evaluation device. The accessory interface includes a receiving section and a contact section. The receiving and contact sections are arranged such that the accessory device can be inserted into the accessory interface in an insertion direction in order to electrically and mechanically couple the accessory device to the accessory interface. A support structure having an integral slot is coupled to the measuring head. The slot has the receiving section for the mechanical connection and the at least one contact section.

10 Claims, 7 Drawing Sheets

(51) Int. Cl.
*G01S 17/02* (2020.01)
*G01S 17/42* (2006.01)
(58) Field of Classification Search
USPC .......................................... 356/5.01
See application file for complete search history.

(56) References Cited

U.S. PATENT DOCUMENTS

2012/0019806 A1* 1/2012 Becker ................. G01C 15/002
356/4.01
2012/0287265 A1 11/2012 Schumann et al.

FOREIGN PATENT DOCUMENTS

| EP | 2005112 B1 | 12/2008 |
|----|------------|---------|
| WO | 2010108643 A1 | 9/2010 |
| WO | 2014034361 A1 | 3/2014 |
| WO | 2014043461 A1 | 3/2014 |
| WO | 2015175473 A1 | 11/2015 |

\* cited by examiner

3D MEASUREMENT DEVICE WITH ACCESSORY INTERFACE

CROSS REFERENCE TO RELATED APPLICATIONS

The present application claims priority to German Patent Application 10 2015 122 843.2 filed on Dec. 27, 2015, the contents of which is incorporated by reference herein in its entirety.

BACKGROUND

DE 10 2009 055 988 B3 discloses a known 3D measurement device, designed as a laser scanner. A measuring head which is rotatable relative to a base about a first axis emits an emitted light beam by means of a light emitter and a mirror which is rotatable relative to the measuring head about a second axis, and receives, by means of the mirror and a light receiver, a reception light beam reflected by an object in the environment of the laser scanner or otherwise scattered. A control and evaluation device determines at least the distance from the object for each of a plurality of measuring points. The angular position sensors assigned to the two axes supply the related angles. With this method, the 3D coordinates of the measuring points can be determined, based on an initial initialization. The rotor that supports the mirror is balanced by a variety of recesses. A color camera integrated into the measuring head supplies 2D color images. In EP 2 005 112 B1, a line camera is mounted at the top of the measuring head.

DE 10 2009 015 922 A1 discloses a known method in which a scene is registered using multiple scans. To accomplish this, after generating one scan, the laser scanner is moved to a new location to generate another scan. The measuring points of the generated scans are registered in a common system of coordinates, and the measuring points together form a three-dimensional point cloud.

BRIEF DESCRIPTION

According to one aspect of the disclosure a 3D measuring device for optically scanning and measuring an environment is provided. The device includes a measuring head rotatable about a first axis. A light transmitter is disposed in the measurement head that is operable to emit a transmitting light beam. A light receiver is disposed in the measurement head that is arranged to receive a receiving light beam reflected from an object in the environment. A control and evaluation device is operably coupled to the light transmitter and light receiver, the control and evaluation device is operable to determine at least the distance to the object for a plurality of measurement points. At least one accessory interface is provided that is configured to allow an accessory device from a group of different accessories to be mechanically connected to the measuring head and can be electrically connected to the control and evaluation device, the accessory interface includes a receiving section and at least a contact section, wherein the receiving section and contact section are arranged such that the accessory device can be inserted into the accessory interface in an insertion direction in order to electrically and mechanically couple the accessory device to the accessory interface. A support structure is coupled to the measuring head. A slot is provided for the at least one accessory interface, wherein the slot is integrally formed with the support structure and wherein the slot has the at least one receiving section for the mechanical connection and the at least one contact section which receives electrical contacts for the electrical connection.

These and other advantages and features will become more apparent from the following description taken in conjunction with the drawings.

BRIEF DESCRIPTION OF DRAWINGS

The subject matter, which is regarded as the disclosure, is particularly pointed out and distinctly claimed in the claims at the conclusion of the specification. The foregoing and other features, and advantages of the disclosure are apparent from the following detailed description taken in conjunction with the accompanying drawings in which:

Figure 1:
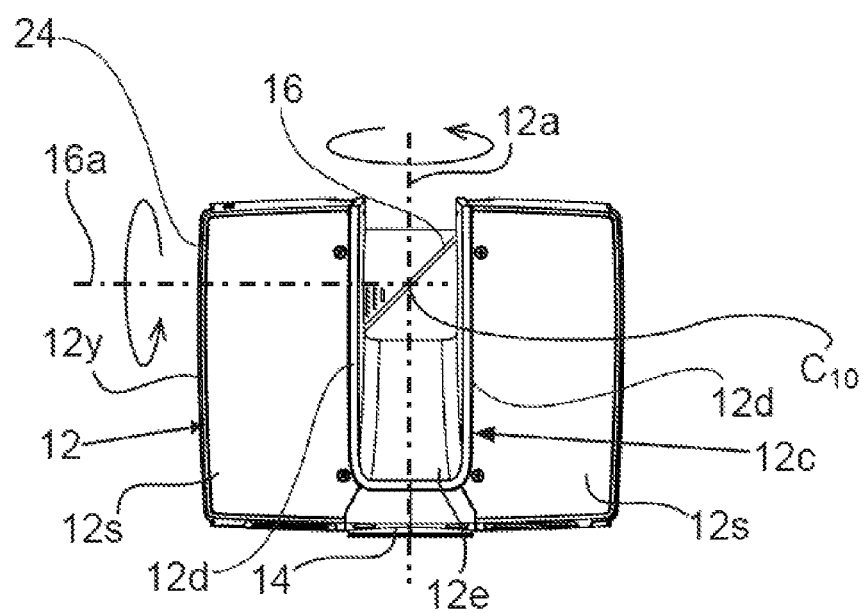
FIG. 1 is a side view of an example of a 3D measurement device.
Figure 2:
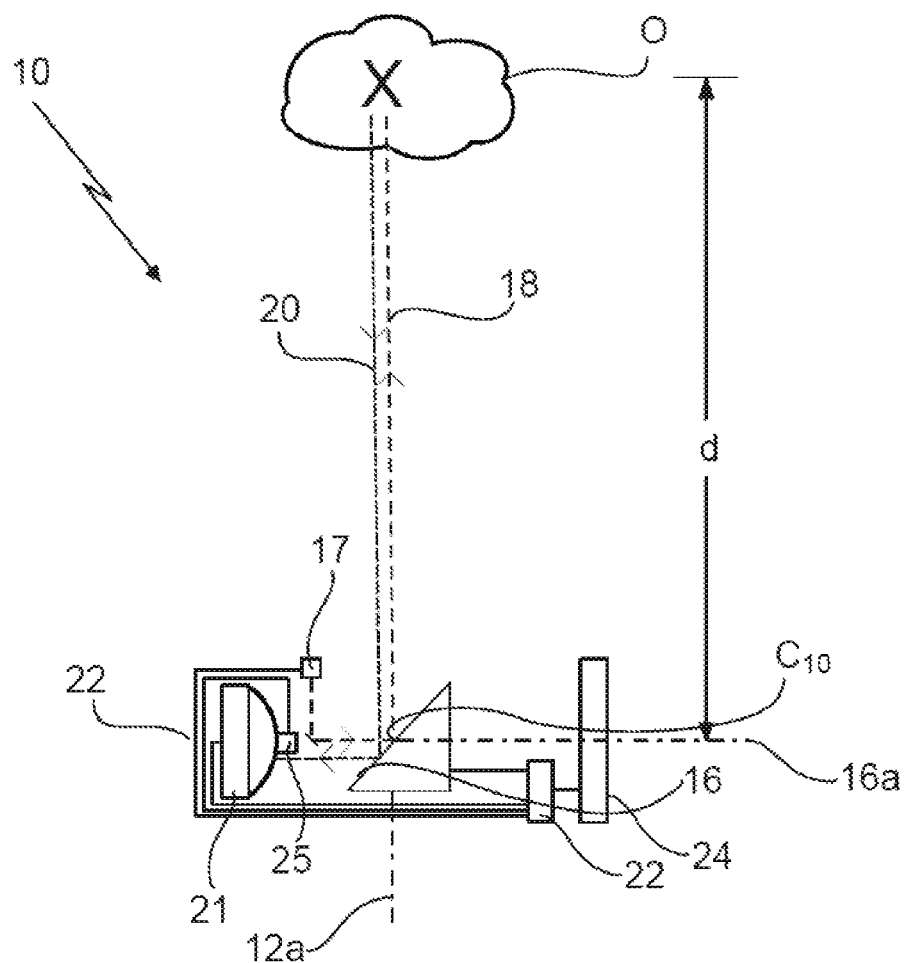
FIG. 2 is a schematic representation of the beam path, including a number of optical and electronic components.
Figure 3:
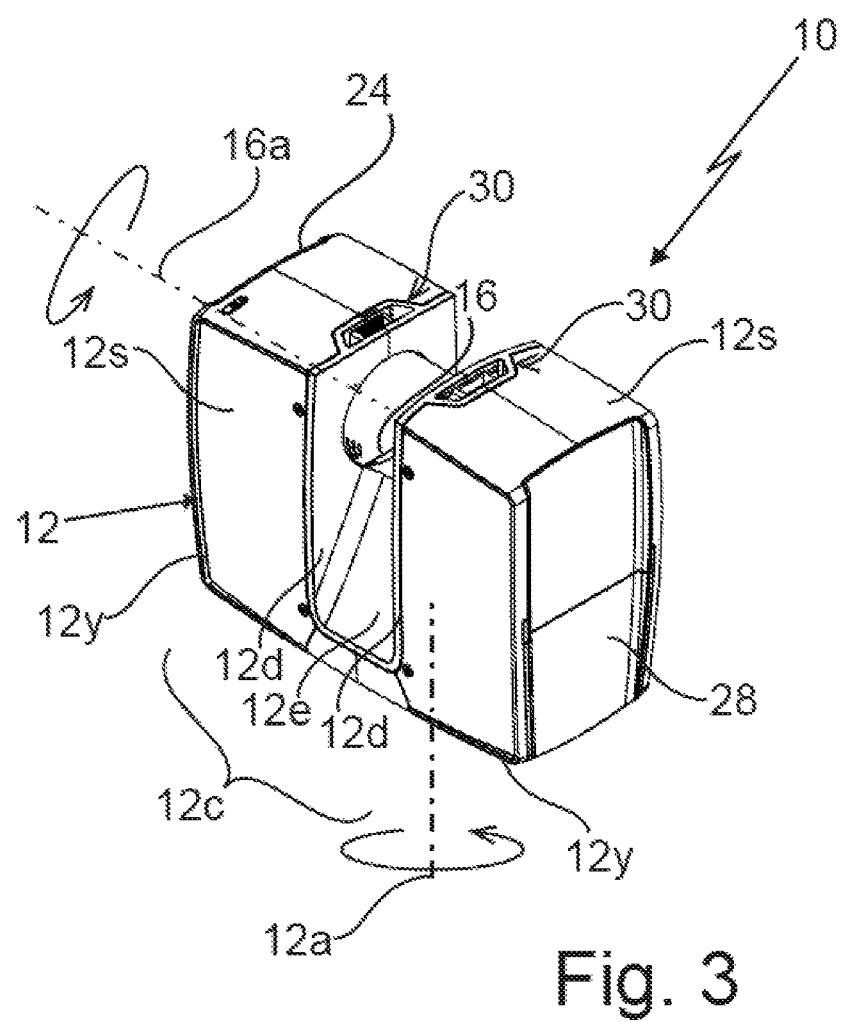
FIG. 3 is a perspective view of the 3D measurement device.
Figure 4:
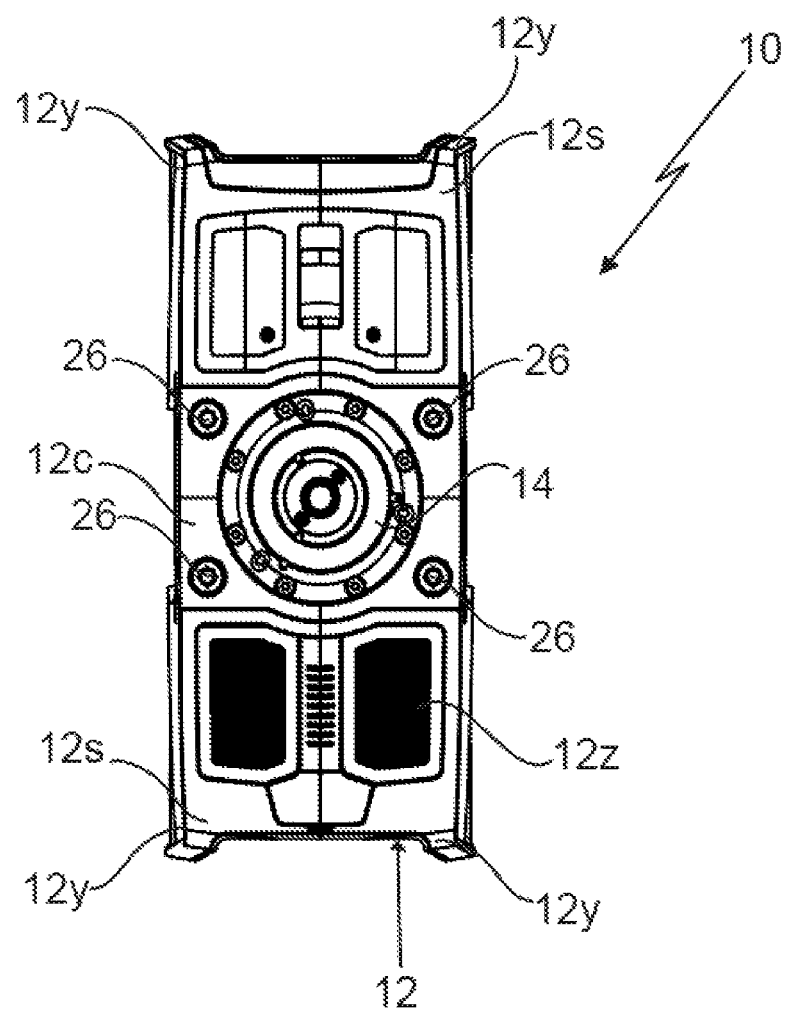
FIG. 4 is a view from the bottom of the 3D measurement device.
Figure 5:
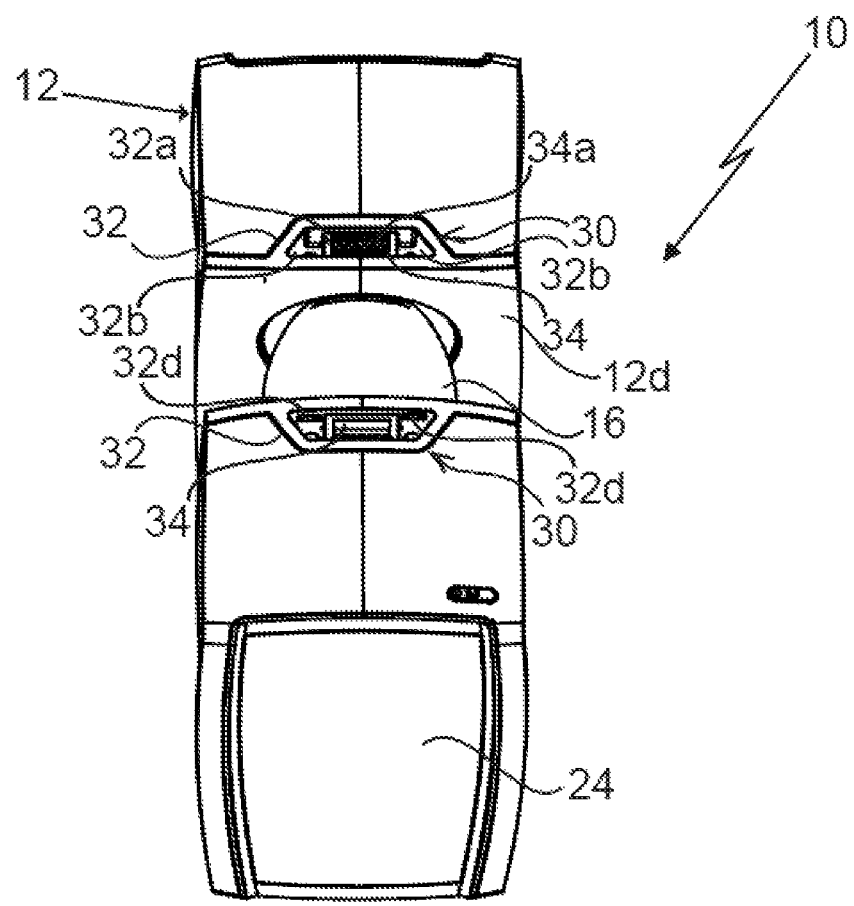
FIG. 5 is an oblique view of two accessory interfaces.
Figure 6:
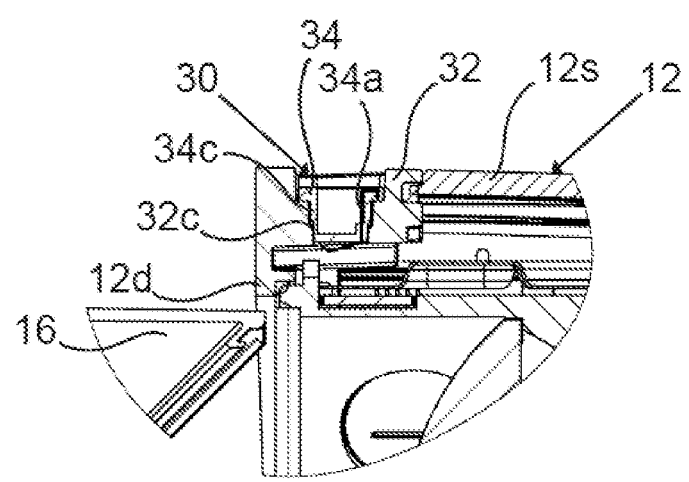
FIG. 6 is a vertical cross-section of an accessory interface.

The detailed description explains embodiments of the disclosure, together with advantages and features, by way of example with reference to the drawings.

DETAILED DESCRIPTION

Embodiments of the present invention provide an improved 3D measurement device of the aforementioned type. These advantages are achieved according to disclosed embodiments by a device having the features of claim 1. Advantageous embodiments are the subject matter of the dependent claims.

The accessory interface enables the connection of many different accessory devices that support the operation of the 3D measurement device. The accessory devices may, for example, supply additional operating or environmental parameters, illuminate the environment or improve communication with the 3D measurement device. Additional memory may also be configured as an accessory device. The accessory devices generally enhance the functions of the 3D measurement device.

The distinctive characteristic these accessory devices have over other accessories is that they move with the measuring head, for example they rotate about the same axis, and during the scanning process their alignment is identical to that of the measuring head. A stable connection between the accessory interface and the accessory device or an adapter is therefore useful. A positive connection can be achieved, for example, in that two protrusions or other pieces of material (along with matching recesses or other material depressions) are provided, which protrude (or open) in different directions, for example in the insertion direction and perpendicular to the insertion direction of the accessory device or adapter into the accessory interface. This enables the accessory to be secured via a catch. In addition, the specific material pieces and material depressions prevent the use of accessory devices that do not fit, and ensure that the proper accessory devices are secured against rotation (poka yoke). If the dimensions of the accessory device or the adapter are significantly larger than those of the accessory interface, additional connections to the measuring head, for example more catch-securing options, may be useful.

In an embodiment, the accessory interface has a slot on the metallic support structure of the measuring head, which produces the mechanical connection. A contact socket made of an insulating material, for example plastic, in which the electrical contacts for the electrical connection are provided, which may be inserted into this slot. The electrical connection is used for connecting one or more data lines and/or control lines and/or power supply lines between the measuring head, or to be more specific its control and evaluation device, and the accessory device.

Embodiments of the present invention relate to a 3D (coordinate) measurement device which directs a beam of light onto an object O, which may be either a (cooperative) target, such as a reflector, or a non-cooperative target, for example a diffusely scattering surface of the object O. A distance meter in the 3D measurement device measures the distance to the object O (i.e., the distance d between the 3D measurement device and the object O), and angular position sensors measure the angular positions of two axes in the device. The measured distance and the two angles enable a processor in the device to determine the 3D coordinates of the object O. In the present case, the 3D measurement device in question is a laser scanner 10, however it will be obvious to a person skilled in the art that this can be easily extended to include a laser tracker or an entire station. Such a device may also be used in cases in which the 3D measurement device is used for measuring distance using projector-camera assemblies, triangulation, epipolar geometry or strip geometries.

Laser scanners are typically used for scanning closed or open spaces such as building interiors, industrial facilities and tunnels. Laser scanners are used for many purposes, including building information modeling (BIM), industrial analyses, accident reconstruction applications, archaeological studies and forensic investigations. A laser scanner can be used for optically detecting and measuring objects in the environment of the laser scanner by registering data points that represent objects within the environment. Such data points are obtained by directing a light beam onto the objects and collecting the reflected or scattered light to determine the distance, two angles (i.e., an azimuthal angle and a zenith angle), and optionally a gray scale value. These raw scan data are collected, stored and sent to one or more computers to generate a three-dimensional image that represents the scanned area or the scanned object. To generate the image, at least three values are collected for each data point. These three values may comprise the distance and two angles, or may be converted values, such as x, y, z coordinates.

The set of drawings shows a laser scanner 10 for optically scanning and measuring the environment of laser scanner 10. Laser scanner 10 has a measuring head 12 and a base 14. Measuring head 12 is mounted on base 14 such that measuring head 12 can be rotated about a first axis 12a relative to base 14, driven by a first rotary drive. This rotation about the first axis 12a can take place around the center of base 14. Measuring head 12 has a mirror 16, which can rotate about a second axis 16a, driven by a second rotary drive. With respect to a normal, upright (with respect to the gravitational direction) position of laser scanner 10, the first axis 12a can be designated as the vertical axis, or azimuthal axis, and the second axis 16a can be designated as the horizontal axis or zenith axis. Laser scanner 10 can have a cardan point or center C10 which is the point of intersection of the first axis 12a and the second axis 16a. The first axis 12a defines the terms "top" and "bottom", even when the axis is inclined relative to the gravitational direction.

In the present embodiment, measuring head 12 has a support structure 12c in the form of a rigid supporting structure to which all other components of measuring head 12 are at least indirectly attached, and in an embodiment is an integral component made of metal, for example by aluminum die casting. Support structure 12c has two walls 12d, which are parallel to one another and to the first axis 12a, and has a cross-member 12e, which connects the two walls 12d in the region of their lower ends. Cross-member 12e is rotatably mounted on base 14 and holds the first rotary drive, designed for rotating measuring head 12 about first axis 12a, and the associated angular position sensor. In the upper region of walls 12d, i.e. above cross-member 12e, an open space is provided, within which mirror 16 is arranged, supported by one of the two walls 12d.

On each of two sides of support structure 12c, measuring head 12 further has a shell 12s, such as made of a material such as a hard plastic. Each of the two shells 12s is associated with one of the two walls 12d and secured thereto (and therefore to support structure 12c), for example by means of screws. Support structure 12c and the two shells 12s form a housing for measuring head 12. The outer edges 12y of shells 12s are those edges of shells 12s that do not rest against support structure 12c. Outer edges 12y define a volume within which measuring head 12 in its entirety is arranged. To protect measuring head 12 from damage, in an embodiment the outer edges 12y are reinforced, and in the exemplary embodiment are protruding and thickened areas of material (beads) that are integral with the associated shell 12s. in other embodiments, the outer edges 12y may be reinforced by a separate bracket.

An upper region of shell 12s on the side of mirror 16 ("mirror-side" shell 12s) holds the second rotary drive for rotating mirror 16 about second axis 16a, along with the associated angular position sensor, and a lower region holds cooling mechanism 12z for the two rotary drives. The other shell 12s, on the side opposite mirror 16 ("receiver side" shell 12s), holds some of the optical and electronic components described in the following, along with the power supply, particularly the sensitive components that must be kept separate from the rotary drives with their electromagnetic interference fields.

Measuring head 12 has an emitter for emitting electromagnetic radiation, for example, a light emitter 17, which emits an emission light beam 18. In the exemplary embodiment, emission light beam 18 is a coherent light such as a laser beam. The laser beam may have a wavelength ranging from about 300 to 1600 nm, for example 790 nm, 905 nm, 1570 nm, or less than 400 nm. In principle, however, other electromagnetic waves having higher or lower wavelengths may be used. Emission light beam 18 may be amplitude-modulated or intensity-modulated, for example, with a sinusoidal or rectangular waveform. In another embodiment, emission light beam 18 may also be modulated differently, for example by a chirp signal, or coherent receiving methods may be used. Emission light beam 18 is sent by light emitter 17 to mirror 16, where it is deflected and emitted to the environment of laser scanner 10.

A reflected light beam, hereinafter referred to as reception light beam 20, is reflected by an object O in the environment. The reflected or scattered light is captured by mirror 16 and deflected onto a light receiver 21 having reception optics. The directions of emission light beam 18 and reception light beam 20 result from the angular positions of measuring head 12 and mirror 16 about axis 12a or 16a. These angular positions are in turn dependent on the respective rotary drives. The angular position about first axis 12a is detected by a first angular position sensor. The angular position about second axis 16a is detected by a second angular position sensor. Mirror 16 is inclined 45° relative to second axis 16a. It thus deflects all incident beams by 90°, i.e., both emission light beam 18, which is incident along the second axis 16a, and reception light beam 20, which is deflected parallel to the second axis 16a toward the reception optics.

A control and evaluation device 22 is data-connected to light emitter 17 and to light receiver 21 in measuring head 12. Since control and evaluation device 22 is a less sensitive component than light receiver 21, it may be located in various places in measuring head 12. In the present embodiment, it is located for the most part within the mirror-side shell 12s. Parts of control and evaluation device 22 may also be arranged outside of measuring head 12, for example as a computer connected to base 14. Control and evaluation device 22 is designed to determine, for a plurality of measuring points X, a corresponding number of distances d between laser scanner 10 and measuring points X on object O. The distance from a specific measuring point X is determined at least in part by the speed of light in the air through which the electromagnetic radiation is propagated from the device to measuring point X. In the exemplary embodiment, the phase shift in the modulated light beam 18, 20, which is sent to the measuring point X and received from there, is determined and is evaluated to obtain a measured distance d.

The speed of light in air is dependent on the characteristics of the air such as air temperature, air pressure, relative humidity and carbon dioxide concentration. These air characteristics influence the refraction index of the air. The speed of light in air is equal to the speed of light in a vacuum divided by the refraction index. A laser scanner of the type described herein is based on the light propagation time in air (the propagation time required for light to travel from the device up to the object and back to the device). A method for distance measurement based on the light propagation time (or the propagation time of another type of electromagnetic radiation) is dependent on the speed of light in air and is therefore easily distinguishable from distance measurement methods based on triangulation. In methods based on triangulation, light is emitted by its light source in a certain direction, and is then collected on a camera pixel in a certain direction. Since the distance between the camera and the projector is known, and since a projected angle is compared with a receiving angle, the triangulation method allows the distance from the object to be determined based on a known length and two known angles of a triangle. The triangulation method thus is not dependent directly on the speed of light in air.

Measuring head 12 may have a pointing and display device 24, which is integrated into laser scanner 10. Pointing and display device 24 may be equipped with a user interface, for example, which allows the operator to supply laser scanner 10 with measurement instructions, in particular to define the parameters or to start the operation of laser scanner 10, and pointing and display device 24 may also display measurement results—in addition to parameters. In the embodiment example, pointing and display device 24 is located on the end face of mirror-side shell 12s, and its user interface is designed as a graphic touch screen.

In addition to detecting distance d from center C10 to a measuring point X, laser scanner 10 can also detect a gray scale value with respect to the received optical power. The gray scale value can be determined, for example, by integrating the bandpass-filtered and amplified signal in the light receiver 21 over a measurement period assigned to measuring points X. Optionally, a color camera 25 may be used for generating color images. Using these color images, colors (R, G, B) may also be assigned as additional values to measuring points X.

One operating mode of laser scanner 10 is sometimes referred to as "sphere mode," in which the environment around laser scanner 10 is scanned by rapidly rotating mirror 16 around second axis 16a while measuring head 12 rotates slowly around first axis 12a. In one embodiment example, mirror 16 rotates at a maximum speed of 5820 revolutions per minute. A scan is defined as the totality of measuring points X in such a measurement. For such a scan, center C10 defines the origin of the local stationary reference system. Base 14 rests in this local stationary reference system. In sphere mode, the scan corresponds to a spherical point cloud, apart from the area which is shaded by cross-member 12e.

Another operating mode of laser scanner 10 is referred to as the "helix" mode, where the mirror 16 rotates about second axis 16a, while measuring head 12 remains stationary relative to base 14. Laser scanner 10 is mounted on a carriage, for example, which moves when laser scanner 10 is in use. In helix mode, the scan has a helical shape. Measuring head 12 may include an immobilization means 26 for immobilizing measuring head 12 on the carriage, optionally provided on base 14 or some other support that supports both base 14 and measuring head 12. Immobilization means 26 bridge the bearing between measuring head 12 and base 14, thereby protecting against damage. The immobilization means may also make it unnecessary to immobilize base 14 on the carriage (which would also be advantageous in terms of redundancies), i.e. laser scanner 10 as a whole is immobilized on the carriage simply via immobilization means 26. In this embodiment, immobilization means 26 is designed as threaded bores, via which measuring head 12 can be screw connected to the carriage or other support.

Light emitter 17, light receiver 21 and the associated optics are arranged in an upper region of the receiver-side shell 12s of measuring head 12. In the lower region of this receiver-side shell 12s, a battery pack 28 which serves as the power supply for laser scanner 10 is arranged, such as behind a protective cover, which can be at least partially removed from shell 12s. The protective cover is may be a pivotable protective lid. Battery pack 28 is may be replaceable (e.g. separable or removable) and rechargeable.

Measuring head 12 may have at least one accessory interface. In the exemplary embodiment two accessory interfaces 30 are provided, which are differently configured. Accessory interfaces 30 are used for producing mechanical and also electrical connections between measuring head 12 and its control and evaluation device 22 on the one hand and an accessory device on the other. Unlike interfaces on base 14, accessory interface 30 and thus the accessory device rotates as measuring head 12 rotates about the first axis 12a. The accessory device may be a device for measuring an operating or environmental parameter (which is provided in addition to the measurement devices integrated into laser scanner 10), for example, an extra inclinometer, a GPS receiver, or an extra camera. The accessory device may also be an illuminating device, for example for emitting infrared light. A diagnostic unit for checking laser scanner 10 is another possible accessory device. Many other accessory devices are conceivable. The matching accessory devices belong to a group of accessory devices, each of which can be mounted on measuring head 12 by means of accessory interface 30 and can be connected to control and evaluation device 22 to communicate with laser scanner 10. Accessory interface 30 may also be used for attaching purely mechanical accessories, such as a handle.

The accessory interfaces 30 provided are located on the upper side of measuring head 12, in the present case at the upper end of walls 12*d* of support structure 12*c*, thus the accessory devices can be mounted on top of and supported by measuring head 12. Associated with each accessory interface 30 is a slot 32 which accommodates accessory interface 30 mechanically. Slot 32 is disposed on the associated wall 12*d* of support structure 12*c*, specifically on the side facing away from the open space, in the form of an alcove. The adjacent shell 12*s* has a corresponding recess. Slot 32 and support structure 12*c* (and thus the wall 12*d* associated with slot 32) are illustrated as integral, for example as die cast aluminum or zinc components. It is also conceivable for slot 32 to be formed separately and secured to wall 12*d* or attached to another point on support structure 12*c* or on shell 12*s*. An integral embodiment of shell 12*s* and slot 32 is also conceivable.

Slot 32 has three sections 32*a*, 32*b* side by side along wall 12*d*, all of which are open toward the top. The three sections 32*a*, 32*b* are one contact section 32*a* at the center, and two receiving sections 32*b* to the sides thereof. The three sections 32*a*, 32*b* may be separated from one another by intermediate walls, as in the present embodiment example, or merely in terms of their function. Contact section 32*a* is formed as a shaft which is open toward the bottom, and which gradually tapers downward. In an embodiment, a groove 32*c* is formed on at least sections of at least one of the inner sides of contact section 32*a* of slot 32. In the present case, two grooves 32*c* are formed in the uppermost stage of contact section 32*a*, extending parallel to one another and to the first axis 12*a* on the inner side of slot 32 which is opposite wall 12*d*. The provided grooves 32*c* may be arranged symmetrically or asymmetrically with respect to the center of said inner sides of contact section 32*a*.

Each of the two provided receiving sections 32*b* is formed as a cup, in other words as closed at the bottom. On the inner side of each receiving section 32*b*, on wall 12*d*, slot 32 has a material depression, hereinafter referred to as indentation 32*d*. Thus an indentation 32*d* is provided on each of the two sides of contact section 32*a*. The two indentations 32*d* may be arranged at the same height (along the first axis 12*a*) or at different heights. Whereas receiving sections 32*b* open parallel to first axis 12*a*, indentations 32*d* open parallel to second axis 16*a*. The direction of insertion into each of receiving sections 32*b* and the direction in which the associated indentations 32*d* open are thus oriented at right angles relative to one another. Different angles are also conceivable. The remaining directions are blocked by a positive connection.

In terms of electrical connections, accessory interface 30 has a contact socket 34, which is inserted from the top into contact section 32*a* of slot 32 and is received therein. Contact socket 34 may have a square pot shape, and is made of plastic or some other insulating material, with electrical contacts 34*a*, for example made of copper. The upper edge of contact socket 34 is equipped with an outwardly facing, circumferential flange, sized and positioned to rest on the uppermost stage of contact section 32*a* inside slot 32. Contact socket 34 has ribs 34*c* that correspond with the provided grooves 32*c* and protrude into the grooves 32*c*. In the present embodiment, ribs 34*c* are formed on the outer side of the flange of contact socket 34. Electrical contacts 34*a* are electrically contacted at their lower end, i.e. on the bottom side of contact socket 34, so that they are connected to control and evaluation device 22—and optionally also to the power supply. In the present embodiment example, the lower ends of electrical contacts 34*a* are formed as spring contacts. However, a mechanically immobile contact may also be provided. If necessary, contact socket 34 may have barbs or the like at its lower end for hooking onto contact section 32*a*.

Contact socket 34 may have the standard dimensions and configurations of a commercially available standardized interface. In the present embodiment, one of the two accessory interfaces 30 is designed as a USB port, and the other is designed for a CAN bus. Additional standardized interfaces and combinations of all of these standardized interfaces are conceivable. In the interfaces that have power supply contacts, power is supplied to the attached accessory device by means of battery pack 28.

To distinguish between the two accessory interfaces 30 during assembly of contact socket 34 and later during mounting of the accessory device (and to allow the rotation-proof insertion of contact socket 34), deviations in the positions of grooves 32*c* and ribs 34*c* (for mounting contact socket 34) and indentations 32*d* (for mounting the accessory device) are possible, specifically in both accessory interfaces 30 and/or within each accessory interface 30. Examples include asymmetric arrangements at different heights (relative to the first axis 12*a*) or a different offset from the center of accessory interface 30. The differently arranged material pieces and material depressions for securing against rotation (poka yoke), if present, may be formed in the region of the walls or the bottom of slot 32. In addition to the mechanical prevention of rotation, color coding is also conceivable, i.e. the different accessory interfaces 30 may have different colors.

The mating piece for accessory interface 30 can be integrated into the accessory device to be mounted. In general, the mating piece for accessory interface 30 is an adapter 41. Adapter 41 can be inserted in an insertion direction into accessory interface 30. In the present embodiment, the insertion direction is parallel to the first axis 12*a*. When in use, adapter 41 is arranged above accessory interface 30 and therefore on top of measuring head 12. The open space between walls 12*d* is reserved for emission light beam 18 and reception light beam 20 and is not covered by adapter 41.

Figure 7:
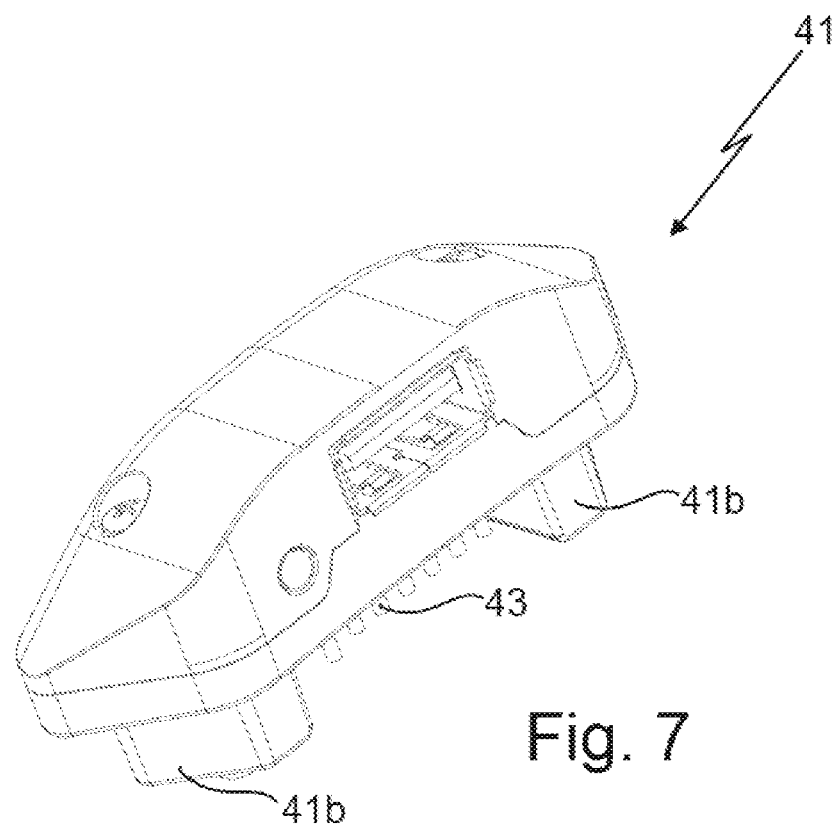
FIG. 7 is a perspective view of one example of an adapter designed to function with the accessory interface.
Figure 8:
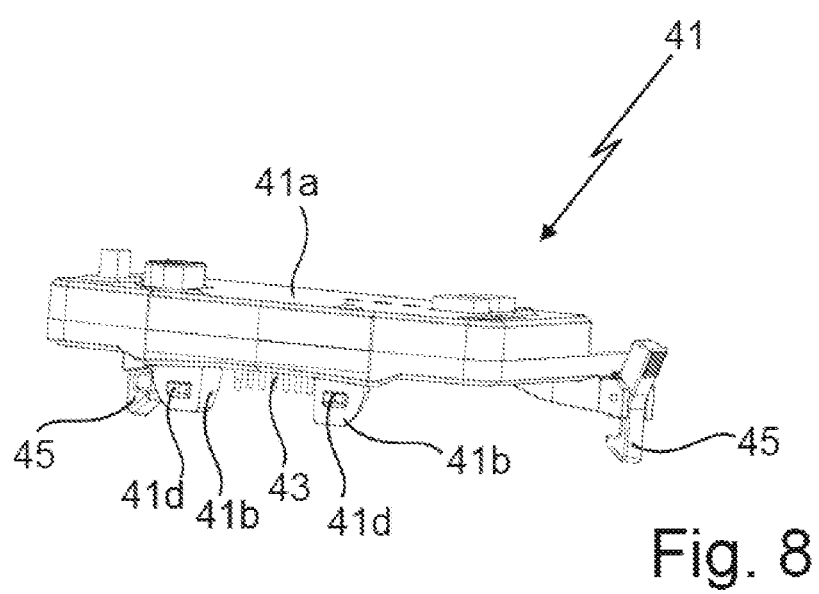
FIG. 8 is a perspective view of another example of an adapter designed to function with the accessory interface.

Various sizes and configurations of adapters 41 are conceivable, two of which are shown in the drawings. Small adapters 41 have, for example, only one additional interface for the accessory device—with the exception of the region that interacts with accessory interface 30—for example a USB interface as shown in FIG. 7. With medium and larger adapters 41, it is possible for the accessory device to be mounted or mountable on adapter 41, optionally by the user. Adapter 41 as shown in FIG. 8 has a mounting plate 41*a*, for example. The dimensions of mounting plate 41*a* can correspond approximately to the dimensions of the top of shell 12*s* of measuring head 12. For smaller accessory devices, smaller mounting plates 41*a* are possible.

At the end of adapter 41 that faces accessory interface 30, the adapter has two protrusions 41*b*. The two protrusions 41*b* project downward from mounting plate 41*a* in the insertion direction, i.e. parallel to the first axis 12*a*. The dimensions of the two protrusions 41*b* and their positions on mounting plate 41*a* are selected such that protrusions 41*b* fit into receiving sections 32*b* of slot 32. In addition, each of protrusions 41*b* in turn has a nib 41*d*. Nibs 41*d* can be, for example, material pieces that protrude from protrusions 41b. In one variant, nibs 41d are spring-loaded, spherically spaced elements that can be moved to a limited extent relative to the associated protrusions 41b.

Each of these nibs 41d protrudes in a direction parallel to the second axes 16a, i.e. perpendicular to the insertion direction. The dimensions of the two nibs 41d and their positions on the associated protrusions 41b are selected such that the nibs 41d fit into the indentations 32d in slots 32. Protrusions 41b together with nibs 41d can thus be hooked into receiving sections 32b along with indentations 32d to form a mechanical connection, specifically a positive connection, between adapter 41 and accessory interface 30. In the variant which has the spring-loaded, movable nibs 41d, a force-fitting connection is also produced. The formation of nibs 41d and indentations 32d on the two interacting components may also be exchanged.

If the two accessory interfaces 30 are provided with differently standardized interfaces and have different positions of indentations 32d to ensure uniqueness, nibs 41d are also differently positioned accordingly. The same applies to a color coding of different accessory interfaces 30, in which case, for example, protrusions 41b (and nibs 41d) or the entire adapter 41 would have the matching color. The color coding may be implemented using adhesive labels, a color coating or colored material.

For cooperation with contact socket 34, i.e. to produce the electrical connection between accessory device and measuring head 12, a connector 43 is provided. Connector 43 is located between the two protrusions 41b and its unattached end points downward. At this unattached end, connector 43 is designed to match contact socket 34, while at the other end, it has a cable or contacts for this purpose or some other electrical connection.

Various embodiments for the connector 43 are possible, in particular including different contact directions. In the two embodiment examples shown in the set of drawings, only the contact tongues of connector 43 are visible, the number of which corresponds to the number of electrical contacts within contact socket 34. Since only one of the two sides of each contact tongue interacts with an electrical contact 34a of contact socket 43, on the other side connector 43 may have a downward projecting support on which the contact tongues are supported. This support of connector 43 may be integrally formed with mounting plate 41a. In other embodiments, connector 43 may be a separately formed component, which can be permanently affixed to mounting plate 41a. It is also conceivable for mounting plate 41a to have an opening through which the separately formed connector 43 is guided when mounting the accessory device, after which it is plugged into contact socket 34.

Since the mechanical connection between adapter 41 and accessory interface 30 can be produced by a simple hook, and can also be separated in the same way, additional mechanical connections between adapter 41 and measuring head 12 are useful, particularly for large accessory devices and thus large adapters 41. In the embodiment, adapter 41 has two hooks 45. Each of the hooks 45 is pivotably mounted on mounting plate 41a and is pre-stressed relative thereto by a small spring. In other embodiments, each hook 45 is made of an elastic material and is attached to mounting plate 41a. Hooks 45 are designed to cooperate with the outer edges 12y of shell 12s arranged below adapter 41. More specifically, hooks 45 are designed to engage (pre-stressed) behind the outer edge 12y designed as a bead. In the present case, the two hooks 45 are arranged on the opposite longitudinal sides of mounting plate 41a and pivot about axes parallel to second axis 16a. When protrusions 41b together with nibs 41d cooperate with receiving sections 32b together with indentations 32d, and hooks 45 cooperate with outer edges 12y, adapter 41 is connected in three areas to measuring head 12 and is thus stably fixed. When hooks 45 are pivoted against their pre-stress direction away from the outer edges 12y, adapter 41 can also be unhooked from accessory interface 30 and can thus be removed from measuring head 12.

In other embodiments (or in addition) to hooks 45, other types of connections are conceivable, for example threaded bores (for example on shells 12s, similar to immobilization means 26) and screws (for example, rotatably mounted in adapter 41).

To protect the existing accessory interfaces 30 against damage and soiling when not in use, a cap for each is provided. The cap has suitable protrusions to allow its insertion into sections 32a, 32b of slot 32 and positively seated there. The cap is made, for example, of rubber or some other elastic material. Also possible is a non-elastic embodiment, in which the cap is removed by means of a rocker or is destroyed when removed.

The term "about" is intended to include the degree of error associated with measurement of the particular quantity based upon the equipment available at the time of filing the application. For example, "about" can include a range of ±8% or 5%, or 2% of a given value.

The terminology used herein is for the purpose of describing particular embodiments only and is not intended to be limiting of the disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the disclosure is provided in detail in connection with only a limited number of embodiments, it should be readily understood that the disclosure is not limited to such disclosed embodiments. Rather, the disclosure can be modified to incorporate any number of variations, alterations, substitutions or equivalent arrangements not heretofore described, but which are commensurate with the spirit and scope of the disclosure. Additionally, while various embodiments of the disclosure have been described, it is to be understood that the exemplary embodiment(s) may include only some of the described exemplary aspects. Accordingly, the disclosure is not to be seen as limited by the foregoing description, but is only limited by the scope of the appended claims.

What is claimed is:

1. A 3D measuring device for optically scanning and measuring an environment, the device comprising:
    a measuring head rotatable about a first axis;
    a light transmitter disposed in the measurement head that is operable to emit a transmitting light beam;
    a light receiver disposed in the measurement head that is arranged to receive a receiving light beam reflected from an object in the environment;
    a control and evaluation device operably coupled to the light transmitter and light receiver, the control and evaluation device is operable to determine at least the distance to the object for a plurality of measurement points;

at least one accessory interface that is configured to allow an accessory device from a group of different accessories to be mechanically connected to an upper side of the measuring head and can be electrically connected to the control and evaluation device, the accessory interface including a receiving section and at least one contact section, wherein the receiving section and the at least one contact section are arranged such that the accessory device can be inserted into the accessory interface in an insertion direction in order to electrically and mechanically couple the accessory device to the accessory interface;

a support structure which is coupled to the measuring head; and a slot which is integrally formed in the support structure for the at least one accessory interface, wherein the slot has the at least one receiving section for the mechanical connection and the at least one contact section which receives electrical contacts for the electrical connection.

2. A 3D measuring device for optically scanning and measuring an environment, the device comprising:

a measuring head rotatable about a first axis;

a light transmitter disposed in the measurement head that is operable to emit a transmitting light beam;

a light receiver disposed in the measurement head that is arranged to receive a receiving light beam reflected from an object in the environment;

a control and evaluation device operably coupled to the light transmitter and light receiver, the control and evaluation device is operable to determine at least the distance to the object for a plurality of measurement points;

at least one accessory interface that is configured to allow an accessory device from a group of different accessories to be mechanically connected to the measuring head and can be electrically connected to the control and evaluation device, the accessory interface including a receiving section and at least one contact section, wherein the receiving section and the at least one contact section are arranged such that the accessory device can be inserted into the accessory interface in an insertion direction in order to electrically and mechanically couple the accessory device to the accessory interface;

a support structure which is coupled to the measuring head;

a slot which is integrally formed in the support structure for the at least one accessory interface, wherein the slot has the at least one receiving section for the mechanical connection and the at least one contact section which receives electrical contacts for the electrical connection; and an adapter disposed between the accessory interface and the accessory, the adapter having at least one nib projecting perpendicular to the insertion direction, and the accessory interface is provided with at least one matching material recess which opens perpendicular to the insertion direction and the slot includes at least one corresponding indentation.

3. The device of claim 2, wherein the support structure has at least one wall that supports a mirror rotatable about a second axis and wherein the slot is arranged on the at least one wall.

4. The device of claim 3, wherein the accessory interface has at least one separately formed contact socket with electrical contacts, the contact socket sized and shaped to be inserted into the slot.

5. The device of claim 4, wherein the contact socket further includes at least one rib that protrudes into at least one groove formed in the slot.

6. The device of claim 5, wherein the measuring head has at least one shell connected to the supporting structure, the shell having at least one outer edge, the shell being reinforced at the at least one outer edge.

7. The device of claim 6, wherein the adapter includes at least one hook pivotally mounted thereon, the at least one hook arranged to engage the at least one outer edge.

8. The device of claim 7, wherein the support structure has a bead shaped portion and the at least one hook engages the bead shaped portion.

9. The device of claim 8, wherein the hook is made from an elastic material.

10. The device of claim 2, wherein the accessory device moves with the measuring head to allow for the accessory device and the measuring head to be identically aligned during the scanning process.

* * * * *